United States Patent [19]
Kravtin et al.

[11] Patent Number: 6,157,370
[45] Date of Patent: Dec. 5, 2000

[54] ERGONOMIC MOUSE EXTENSION

[75] Inventors: Benson Kravtin, Brooklyn, N.Y.; Oliver Hood, Dublin, Ireland

[73] Assignee: Softview Computer Products Corp.

[21] Appl. No.: 08/763,683

[22] Filed: Dec. 11, 1996

Related U.S. Application Data

[63] Continuation-in-part of application No. 08/582,496, Jan. 3, 1996, abandoned.

[51] Int. Cl.$^7$ ...................................................... G09G 5/08
[52] U.S. Cl. ....................... 345/163; 345/164; 248/118.1; 248/118.3
[58] Field of Search .................................... 345/163, 164, 345/165, 166; 248/118.1, 118.3, 118.5

[56] References Cited

U.S. PATENT DOCUMENTS

| | | | |
|---|---|---|---|
| 4,973,176 | 11/1990 | Dietrich | 400/715 |
| 5,260,696 | 11/1993 | Maynard, Jr. | 345/163 |
| 5,340,067 | 8/1994 | Martin et al. | 248/118.5 |
| 5,375,800 | 12/1994 | Wilcox et al. | 248/118.1 |
| 5,414,445 | 5/1995 | Kaneko et al. | 345/163 |
| 5,433,407 | 7/1995 | Rice | 248/118.1 |
| 5,490,647 | 2/1996 | Rice | 248/118.1 |
| 5,562,270 | 10/1996 | Montague | 248/118.1 |
| 5,570,112 | 10/1996 | Robinson | 345/163 |
| 5,581,277 | 12/1996 | Tajiri | 345/163 |
| 5,648,798 | 7/1997 | Hamling | 345/163 |

*Primary Examiner*—Edward Lefkowitz
*Assistant Examiner*—Davetta W. Goins
*Attorney, Agent, or Firm*—Coudert Brothers

[57] ABSTRACT

A computer pointing device includes a conventional computer mouse in combination with an ergonomic extension. The ergonomic extension is attached to the computer mouse for movement therewith and is positioned adjacent to the computer mouse for facilitating use of the mouse by a user in an ergonomically correct position. An adjustment mechanism enables the user to adjust the position of the computer mouse relative to the ergonomic extension for enabling use of the computer mouse and ergonomic extension by users having different size hands. In one embodiment the adjustment mechanism includes an extension arm fixed to the computer mouse; a slot in the ergonomic extension adapted to receive the extension arm; and a lock for releasably locking the extension arm in a desired position in the slot. In another embodiment, the ergonomic extension includes a cavity therebeneath for insertion of a rear portion of the computer mouse. Hook and loop fasteners on the cavity wall and the computer mouse upper surface provide for adjustable attachment therebetween. In a further embodiment, adjustment is provided by teeth on the mouse that engage with teeth on the ergonomic extension for providing position adjustment. The teeth on the mouse are positioned on a rearwardly extending lever. Guided movement is provided by a guide slot on the ergonomic extension that engages with a protuberance on the rearwardly extending lever.

3 Claims, 7 Drawing Sheets

ERGONOMIC MOUSE EXTENSION

CROSS-REFERENCE TO RELATED APPLICATIONS

This is a continuation-in-part of U.S. patent application Ser. No. 08/582,496, filed Jan. 3, 1996 now abandoned, the content of which is incorporated herein by reference.

BACKGROUND OF THE INVENTION

1. Field of the Invention

The present invention relates to an ergonomic wrist rest for a computer mouse, and more particularly to an ergonomic wrist rest for a computer mouse that is length-adjustable so as to enable the wrist rest to provide an ergonomic benefit to users with different size hands.

2. Description of the Related Art

With the advent of graphical interfaces for personal computers, i.e., Macintosh™ and Microsoft Windows™, "point and click" operation has become widespread. At least two types of devices are presently used for "point and click" operation. The first type of device is the stationary track ball, which remains in a fixed position and which is manipulated to move a pointing element on a computer screen. The other type of device is a "mouse", which is moved on a flat surface to effect corresponding movement of an icon on a computer screen.

Use of a computer mouse requires constant hand and arm movement with concomitant ergonomic considerations. With a conventional computer mouse, there is generally an unnatural flexion of the user's wrist from a normal, at-rest position. In addition, normal movement of the mouse entails either irritating movement of the user's wrist and arm on the rolling surface or uncomfortable unsupported arm movement. Constant and continual movement of the mouse is therefore tiring and stressful to the user and may result in carpal tunnel syndrome. A more detailed description of the ergonomic shortcomings resulting from the use of a conventional mouse is discussed, for example, in U.S. Pat. Nos. 5,340,067 and 5,433,407.

In response to these problems, a number of devices have been devised to augment the conventional mouse. For example, U.S. Pat. No. 5,433,407 relates to a palm rest for a computer mouse that includes a cavity for accepting at least a portion of the computer mouse thereunder. The palm rest, however, is not movable with the mouse.

U.S. Pat. No. 5,340,067 relates to a support block for supporting the hand and wrist of the user, and a retainer for retaining the mouse in fixed relation to the support block. In this device, the mouse and support are in fixed position so that a separate such device must be provided for use by persons with different size hands.

Other ergonomic devices include, for example, foam block wrist rests that are used to support and cushion the wrist against irritation and fatigue from unsupported arm movements. Other devices are designed to engage the mouse at its tail end, with the formation of an extension upon which the wrist can be rested and which is used to push or pull the mouse. Even with such devices, ergonomic problems are either not completely resolved or such devices actually introduce other irritations. Furthermore, with many of such devices control of the pointing icon is often lessened. Thus, many prior art devices provide only partial support for the user's hand, or actually isolate the hand from full control of the mouse.

It is accordingly an object of the present invention to provide an extension device for a computer mouse that provides improved comfort during continued use, but without lessened control of the mouse.

It is a further object of the invention to provide the extension device as an integral extension of the mouse that moves with the mouse, with the size of the extension being adjustable for users with different size hands.

These and other objects, features and advantages of the present invention will become more evident from the following discussion and the drawings.

SUMMARY OF THE INVENTION

The present invention is a computer pointing device which utilizes a conventional computer mouse in combination with an ergonomic extension adapted to support a human palm. The ergonomic extension is attached to the computer mouse for movement therewith and is positioned adjacent to the computer mouse for facilitating use of the mouse in an ergonomically correct position. Adjustment means enables the user to adjust the position of the computer mouse relative to the ergonomic extension for enabling use of the computer mouse and ergonomic extension by users having different size hands.

In one embodiment of the invention, the adjustment means includes i) an extension arm fixed to the computer mouse and extending therefrom; ii) a slot in the ergonomic extension adapted to receive the extension arm for slidable movement of the extension arm therein; and iii) locking means for releasably locking the extension arm in any of a plurality of positions in the slot. A preferred locking means includes a protuberance on the extension arm and a plurality of notches adjacent to the slot. The protuberance engages with any of the plurality of notches to lock the extension arm in position.

In another embodiment of the invention, the computer mouse has a rear portion and an upper surface and the ergonomic extension includes a cavity therebeneath adapted for insertion of at least part of the rear portion of the computer mouse. At least a portion of the wall of the cavity is in contact with the computer mouse upper surface. Hook and loop fastening means on the cavity wall and the computer mouse upper surface provides for releasable attachment therebetween so as to adjust the position of the computer mouse relative to the ergonomic extension.

In a further embodiment of the invention, guide means is provided on the computer mouse and the ergonomic extension for facilitating guided movement of the computer mouse relative to the ergonomic extension. The means for adjusting the position of the computer mouse relative to the ergonomic extension includes a plurality of teeth on the computer mouse that engage with a plurality of teeth on the ergonomic extension for releasably locking the ergonomic extension in any of a plurality of positions with respect to the computer mouse. The plurality of teeth on the computer mouse are preferably positioned on a rearwardly extending lever. The guided movement is provided by a first guide slot on the ergonomic extension that engages with and is guided by a protuberance on the rearwardly extending lever. The ergonomic extension preferably includes a bottom cover, with the first guide slot and plurality of teeth on the ergonomic extension being positioned on the bottom cover.

The plurality of teeth are preferably arranged in parallel rows positioned on opposite sides of the first guide slot, with the plurality of teeth on the rearward extension being positioned in corresponding parallel rows on opposite sides of the protuberance. Guided movement may also be provided by one or more rearward facing guide slots on the computer mouse that guide one or more forward extensions on the ergonomic extension. A frame member positioned adjacent to the rearward extension lever defines at least one second guide slot between the rearward extension lever and the frame member. The ergonomic extension includes a downward guide arm extending into the at least one second guide slot, also for guiding movement of the computer mouse relative to the ergonomic extension.

BRIEF DESCRIPTION OF THE DRAWINGS

FIG. 2 is a cross-sectional view taken along Section 2—2 of FIG. 1a;

FIG. 3 is a bottom view of the mouse extension of FIG. 1a;

FIG. 4 is an elevation view of a palm support area of the mouse extension of FIG. 1a;

DETAILED DESCRIPTION OF THE INVENTION

Figure 1A:
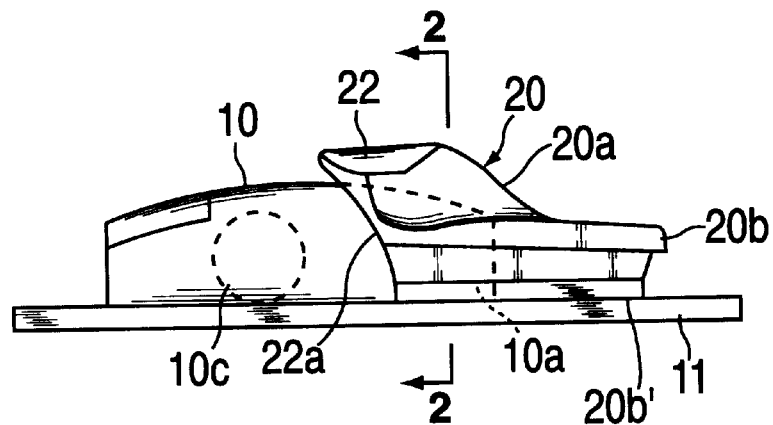
FIG. 1a is a side view of one embodiment of the mouse extension of the invention, with the interior shown in phantom.

FIGS. 1a, 1b, and 2–4 show a typical computer mouse 10 situated on a mouse pad 11, which provides a rolling surface for the mouse. A mouse guide extension 20 is positioned on a tail section 10a of mouse 10 and includes a one piece molded polyurethane structure with an upper gradually sloped surface 20a that conforms, with hollows and raised areas, to a human palm 30 in a natural relaxed position. Because of variations in the sizes of human palms, the upper surface 20a is adapted to completely or substantially completely support a small palm or a substantial portion of the base of a large palm. Base element 20b elevates the palm support surface 20a, preferably by about ½" (1.3 cm), sufficient to keep the user's hand 31 and wrist 32 from the rolling surface 11 but not too high whereby positive mouse control is adversely affected or wrist flexion deviates from the relaxed position shown. The bottom surface 20b' of baser element 20b is in contact with the rolling surface 11 and preferably includes a smooth material, such as a rigid plastic 21, to reduce frictional drag during movement of the mouse and extension.

The raised area 22 of palm support surface 20a overlies a hollowed out concavity 22a into which mouse tail 10a is inserted and entrapped. The portion of the mouse retained by the extension 20 is such that the raised area 22 is level with or slightly above the highest point of mouse 10 whereby the fingers of the user are in a relaxed, resting position on mouse buttons 13a, and 13b (and 13c with a three button mouse). Because of the resilient nature of extension 20, the user's palm and fingers, which exert a normal downward force due to gravity, are flexibly transmitted to mouse 10 to stabilize mouse ball 10c against rolling surface 11 at all times. Mouse 10 is held within concavity 22a by releasable hook and loop strips 40 and 41 respectively, which are adhered to the interior wall of concavity 22a and mouse tail 10a respectively. Hook and loop strips 40 and 41 are preferably sized so as to enable some adjustment in the position of extension 20 relative to mouse 10 to suit the user's comfort. In other words, the overall length of the mouse and extension is preferably somewhat adjustable by separating the hook and loop fasteners, repositioning the mouse relative to the extension to the desired position, and then reattaching the hook and loop fasteners to each other.

Figure 1B:
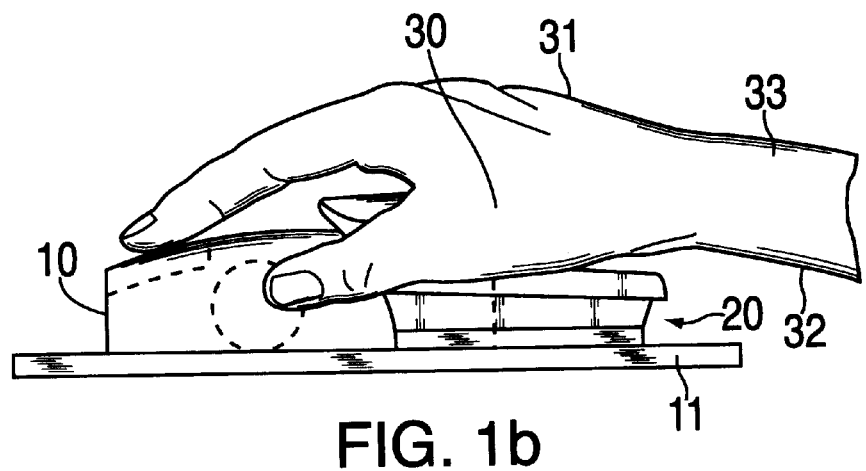
FIG. 1b shows the mouse extension of FIG. 1a as it is being utilized.
Figure 2:
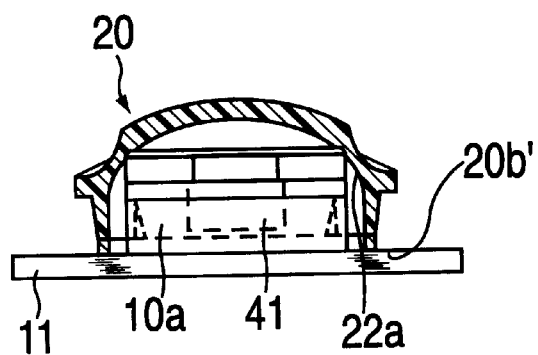
Figure 3:
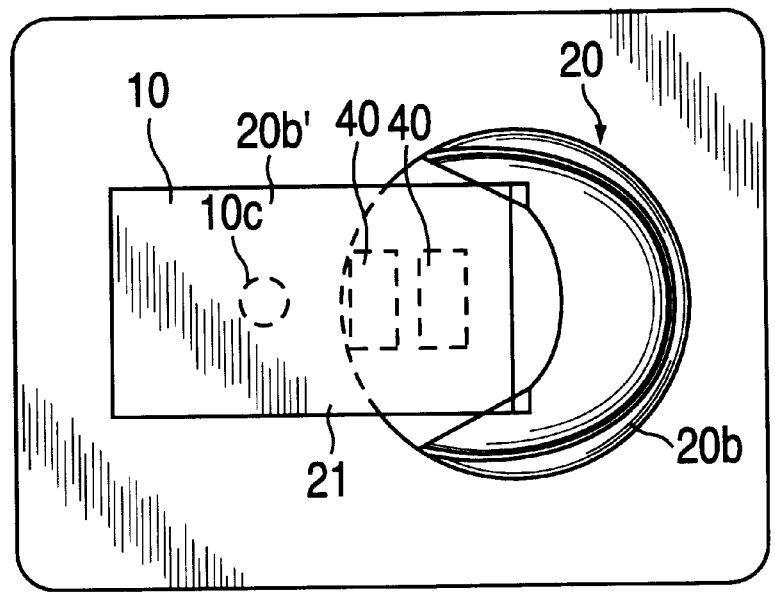
Figure 4:
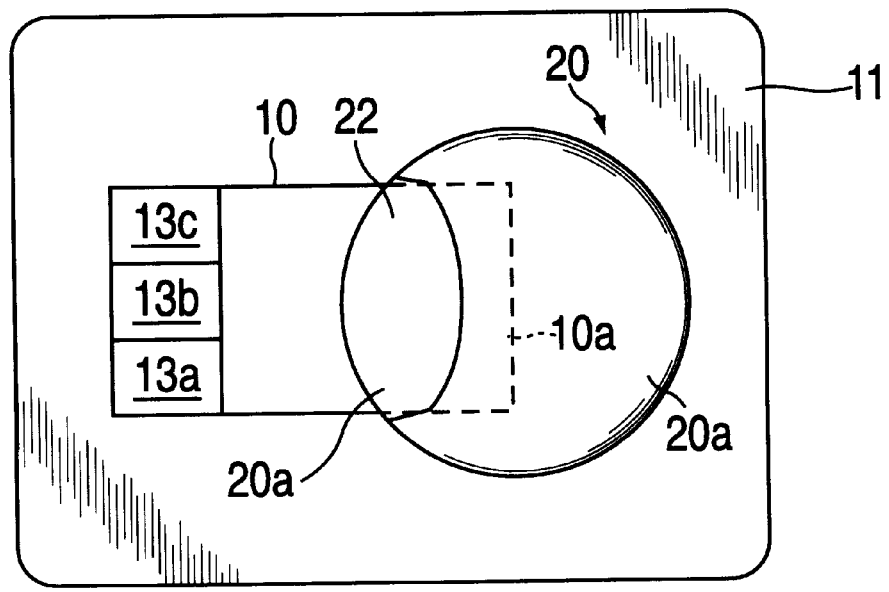

As shown in FIG. 1b, the user's palm 30, hand 31, wrist. 32 and arm 33 are aligned in a natural relaxed extension, with palm 30 bearing the weight of the operating arm 33. Mouse movement is effected by movement of the palm and arm without flexion of wrist 32 and without unnatural continued gripping of an object.

Figure 5:
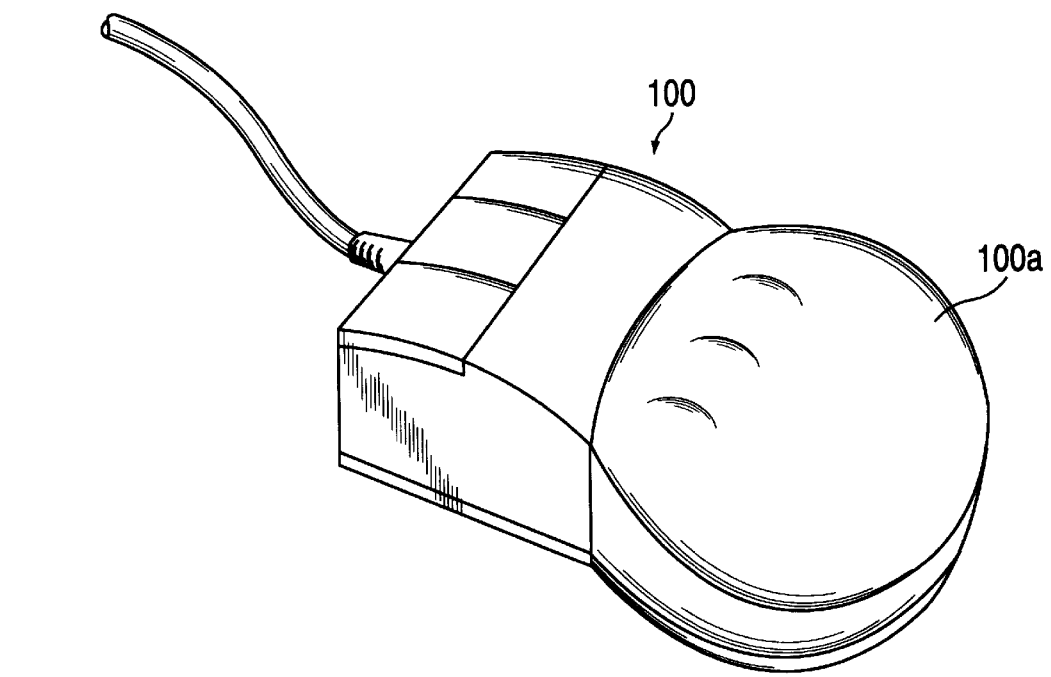
FIG. 5 is an isometric view of an integrated mouse and mouse extension in an alternative embodiment of the present invention.
Figure 5A:
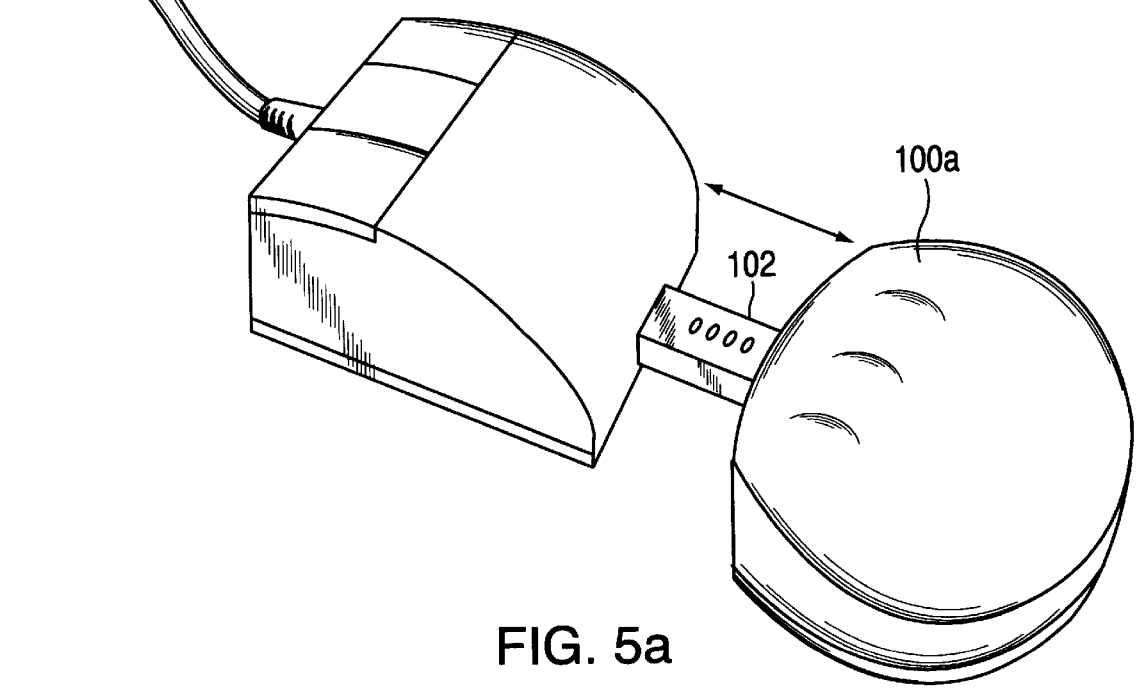
FIG. 5a shows the integrated mouse and mouse extension of FIG. 5 in an elongated position for users with large hands.

In an alternative embodiment of the invention, as shown in FIG. 5, mouse 100 comprises an integrated tail extension 100a preferably constructed of the resilient materials of the extension 20 shown and described with respect to FIGS. 1–4 and provides the same ergonomic benefits and control. As seen in FIG. 5a, mouse 100 is separable from extension 100a to a limited extent by means of extension arm 102. Extension arm 102 includes a plurality of notches, which define selected adjustment positions for palm support tail extension 100a. Extension arm 102 is preferably fixedly attached to, or extends into the rear of mouse 100. Extension 100a preferably includes a slot on the forward end thereof for enabling the insertion of extension arm 102 therein. A protuberance (not shown) is disposed adjacent to the slot, either on the interior or exterior of extension 100a, and extends into the slot. The protuberance engages with one of the notches on extension arm 102 to lock extension 100a into a desired position. The protuberance is preferably biased so as to engage with a notch aligned therewith to hold extension 100a in position. When it is desired to vary the position of the mouse 100 relative to extension 100a, a sufficient amount of force is applied to bring the protuberance out of engagement with the notch. It will be appreciated that extension arm 102 may be fixed to extension 100a and extend into a slot in mouse 100, if desired. Similarly, the protuberance may be located on extension arm 102, and the notches located in the slot.

In another alternative embodiment of the invention, as shown in FIGS. 6–10, a computer mouse 52 includes a mouse body 54 and an adjustable wrist support 50. Mouse 52 is generally arcuate shaped and includes a plurality, preferably 2 or 3, conventional mouse keys 58, which may be arcuate shaped as well. Finger support slots 60 provide curved surfaces to support the first and fifth fingers while mouse keys 58 are being operated by the middle three fingers. It will be appreciated that for a two-button mouse, an additional finger slot 60 may be provided to support the additional unused finger. Moreover, while the embodiment of the invention shown in the drawings is unhanded, i.e., it is equally adapted for used by right and left handed persons, it will be appreciated that finger slots 60 may be contoured, or more space may be provided on one side of the buttons than on the other side of the buttons so as to make the mouse 52 a handed mouse, i.e., designed for more comfortable use by either a right-handed or left-handed person.

Mouse body 54 includes an upper surface 62 over which extends an extension portion 64. Wrist support 50 includes an upper contoured surface 66 that is adapted to support the wrist of a person using mouse 52. Contoured surface 66 is preferably contoured in any desired configuration so as to raise the wrist of the user and support the hand of the user in a manner that provides an ergonomic benefit to the user.

Figure 8:
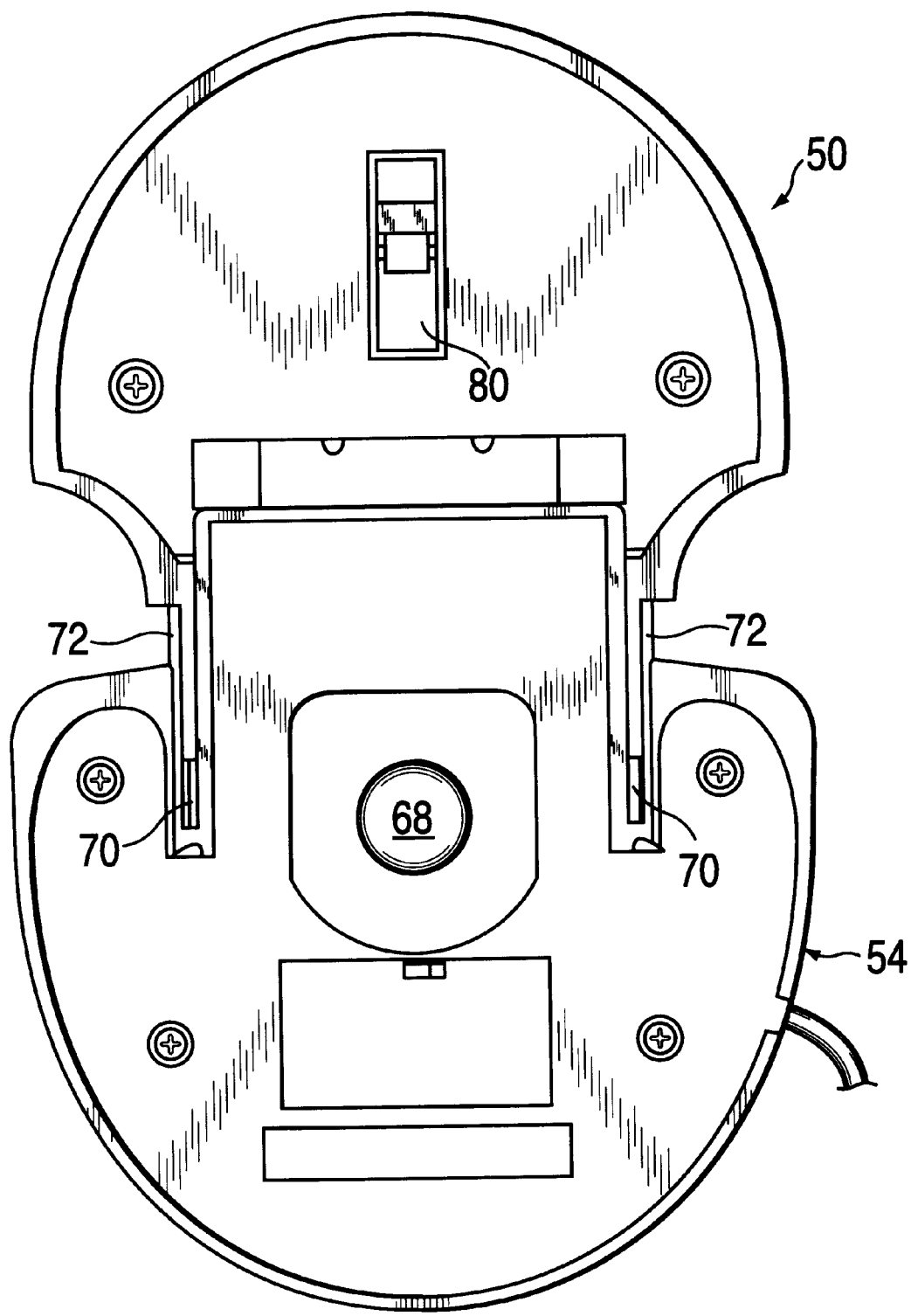
FIG. 8 is a bottom view of the mouse and wrist support shown in FIG. 6.

Mouse body 54 and wrist support 50 are each preferably constructed of a molded thermoplastic or any other appropriate material. If desired, a cushioning material, such as a foam, may be applied to contoured surface 66 to cushion the wrist of the user. As shown in FIG. 8, a mouse ball 68 is provided in the bottom of mouse body 54 to facilitate use of the mouse as a pointing device in a manner well known in the art.

Figure 6:
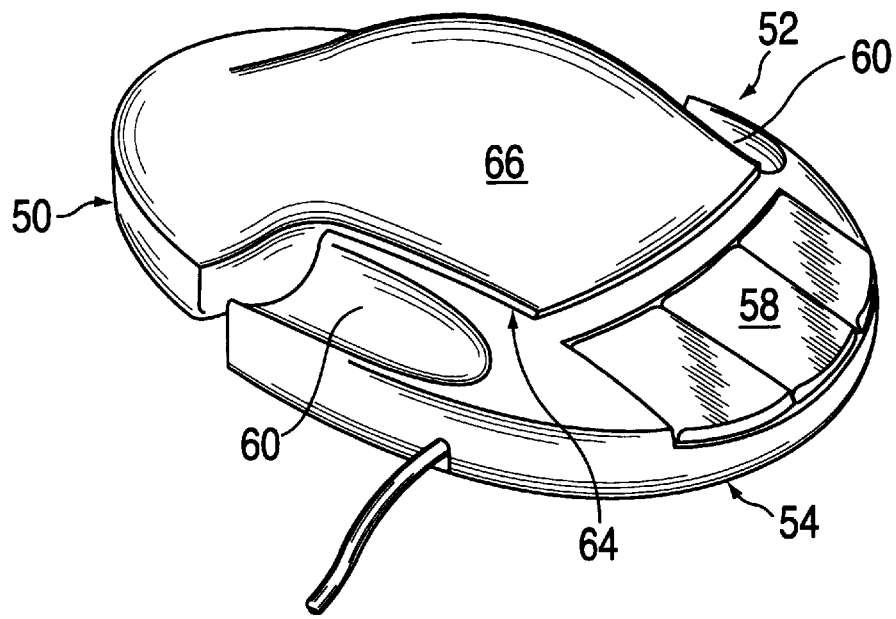
FIG. 6 is a perspective view of a further alternative embodiment of the invention in which the wrist support is in a retracted position.
Figure 7:
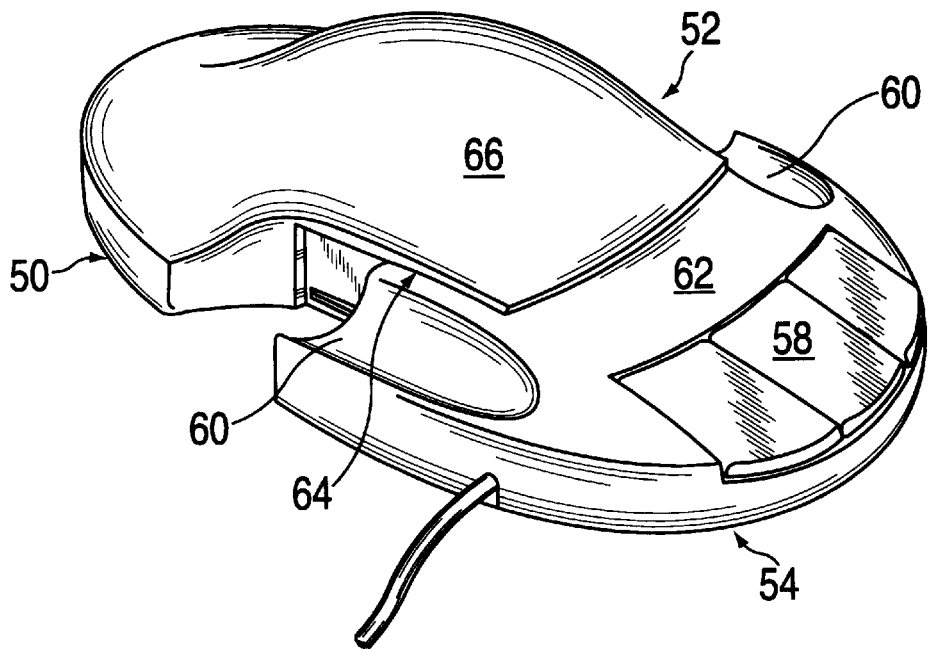
FIG. 7 is a perspective view of the embodiment of the invention shown in FIG. 6, in which the wrist support is in an extended position.

Wrist support 50 is preferably movable relative to mouse body 54 so as to adjust the overall length of the device to thereby enable the wrist support to be used by those with different size hands. FIG. 6 shows wrist body 50 in a fully retracted position in which mouse 52 has the shortest overall length. FIG. 7 shows mouse 52 in an extended position in which wrist rest 50 is fully extended from mouse body 54 so as to enable the device to be used comfortably by users with larger size hands.

Mouse body 54 includes a pair of slots 70 that engage with corresponding extensions 72 on wrist rest 50 so as to guide movement of wrist rest 50 into and out of mouse body 54. When wrist support 50 is fully inserted into mouse body 54, stop 74 may contact mouse body 54 to prevent further movement of wrist support 50 into mouse body 54, if desired. A lower edge 76 of mouse body 50 defines the portion 64 that extends over the upper surface 62 of mouse body 54. Lower edge 76 preferably rests upon upper surface 62 so as to retain the contoured shape of the device and so as to make the device comfortable for the user.

Figure 9:
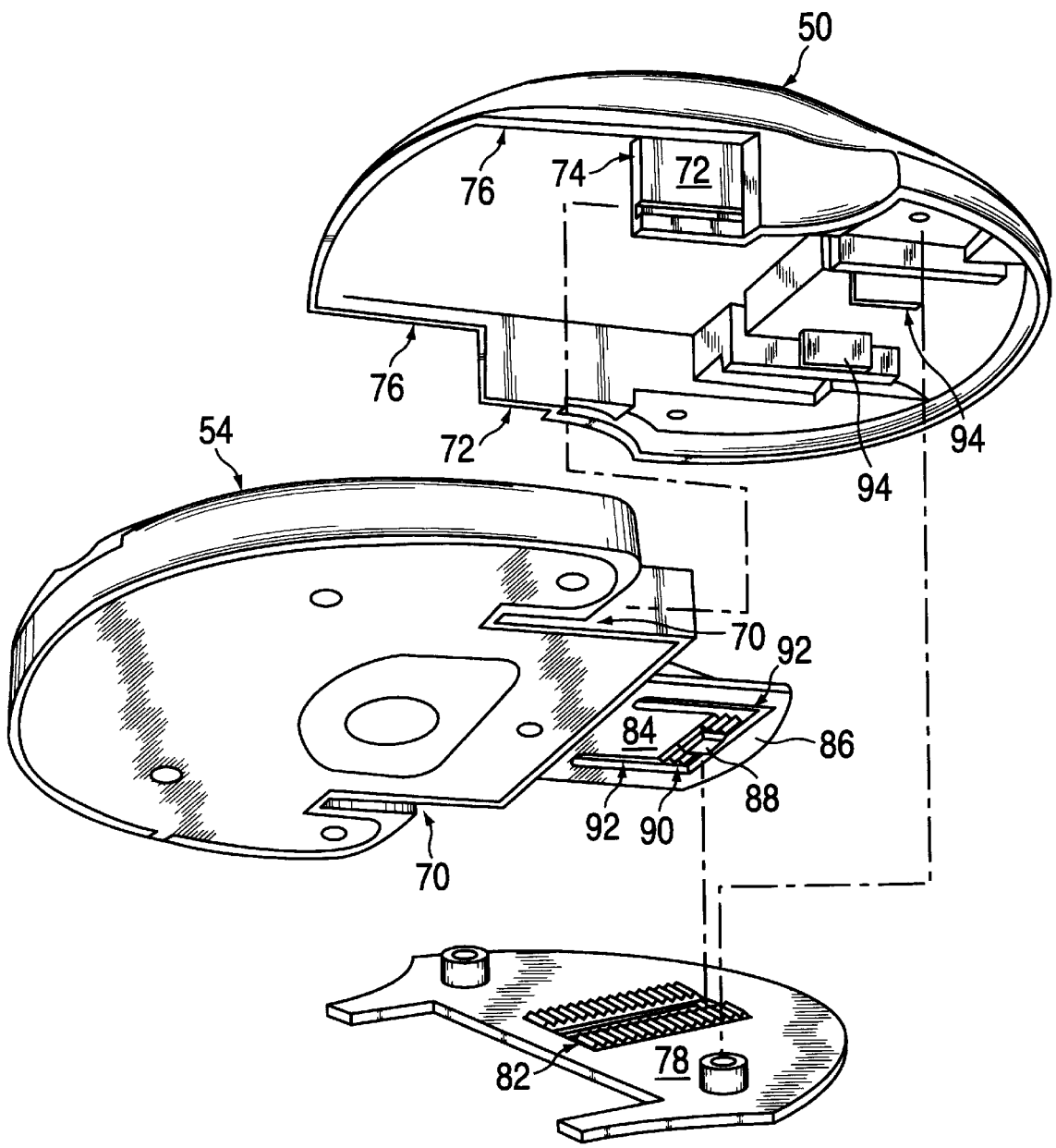
FIG. 9 is an exploded view of the mouse and wrist support shown in FIG. 6.
Figure 10:
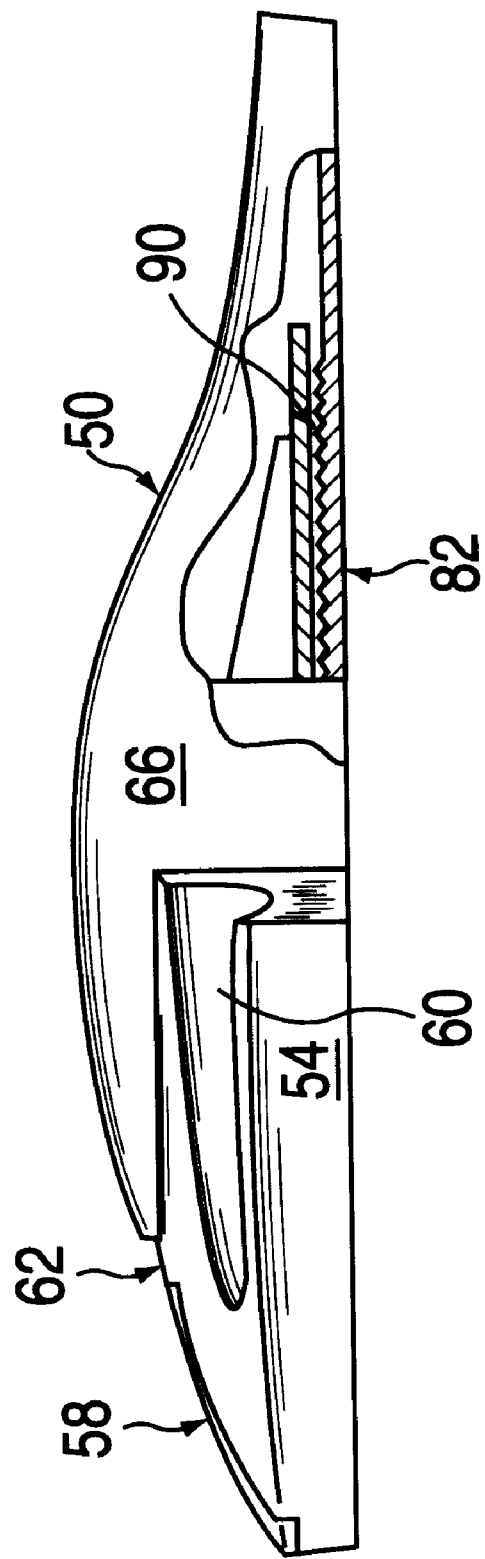
FIG. 10 is a side view of the mouse and wrist support shown in FIG. 6 with the extension mechanism shown in partial cut-away.

As shown in FIG. 9, a locking adjustment mechanism is provided for locking wrist support 50 in a desired position relative to mouse body 54. A lower cover 78 of wrist support 50 includes a central guide slot 80 and one or more rows of teeth 82. Teeth 82 are generally triangular in cross-section, although any appropriate shape teeth may be utilized, if desired. Mouse body 54 includes a lever 84 extending rearwardly therefrom. A frame 86 extends about the periphery of lever 84, with a pair of guide slots 92 defined between frame 86 and lever 84. Although lever 84 and frame 86 are preferably integrally constructed with mouse body 54, these may be separately attached to mouse body 54, if desired. Toward the distal end of lever 84, a protuberance 88 is provided that is sized and shaped to be inserted into and guided by slot 80, and may also serve as a stop to prevent movement of the ergonomic extension beyond a desired position. One or more rows of teeth 90 on the distal end of lever 84 engage with the corresponding rows of teeth 82 on bottom cover 78. Lever 84 is preferably somewhat resilient and, in a relaxed position, teeth 90 engage with teeth 82 to retain wrist support 50 in a locked position relative to mouse body 54. When it is desired to adjust the extension of the wrist support relative to the mouse body, force is applied to wrist support 50 and to mouse body 54 sufficient to overcome the resiliency of lever 54 so as to bring teeth 90 out of engagement with teeth 82 and to enable movement of the wrist support relative to the mouse body. It will be appreciated that teeth 82 and 90 may be moved to different locations on the wrist support and mouse body provided that these elements perform the functions described herein. A pair of downwardly extending guide arms 94 engage with guide slots 92 to guide movement of the wrist support relative to the mouse, and may also serve as stops to prevent such movement beyond a predetermined position.

It is understood that the above description and preferred embodiment are illustrative of the invention and that details contained therein are not to be construed as limitations thereon. It is also understood that changes may be made in the configuration, structure and materials (e.g., other flexible materials such as natural and synthetic rubbers) used in the mouse extension of the present invention without departing from the scope of the invention as defined in the following claims.

What is claimed is:

1. A computer pointing device which comprises:

a computer mouse;

an ergonomic extension adapted to support a human palm, the ergonomic extension being attached tot he computer mouse for movement therewith and positioned adjacent to the computer mouse for use thereof by a user in an ergonomically correct position; and means for adjusting the position of the computer mouse relative to the ergonomic extension for enabling use of the computer mouse and ergonomic extension by users having different size hands, wherein the means for adjusting the position of the computer mouse relative to the ergonomic extension comprises:

an extension arm fixed to the computer mouse and extending outwardly therefrom;

a slot in the ergonomic extension adapted to receive the extension arm for slidable movement of the extension arm therein; and locking means for releasably locking the extension arm in any of a plurality of positions in the slot wherein the locking means comprises:

a) a protuberance on the extension arm and a plurality of notches adjacent to the slot, the protuberance engaging with any of the plurality of notches; or b) protuberance adjacent to the slot and a plurality of notches on the extension arm, the protuberance engaging with any of the plurality of notches.

2. A computer pointing device which comprises:

a computer mouse;

an ergonomic extension adapted to support a human palm, the ergonomic extension being attached tot he computer mouse for movement therewith and positioned adjacent to the computer mouse for use thereof by a user in an ergonomically correct position; and means for adjusting the position of the computer mouse relative to the ergonomic extension for enabling use of the computer mouse and ergonomic extension by users having different size hands, wherein the means for adjusting the position of the computer mouse relative to the ergonomic extension comprises:

an extension arm extending between the computer mouse and the ergonomic extension;

a slot in the computer mouse or the ergonomic extension adapted to receive the extension arm for slidable movement therein; and locking means for releasably locking the extension arm at any of a plurality of positions in the slot, wherein the locking means comprises:

c) a protuberance on the extension arm and a plurality of notches adjacent to the slot, the protuberance engaging with any of the plurality of notches; or d) a protuberance adjacent to the slot and a plurality of notches on the extension arm, the protuberance engaging with any of the plurality of notches.

3. A computer pointing device which comprises:

a computer mouse;

an ergonomic extension adapted to support a human palm, the ergonomic extension being attached tot he computer mouse for movement therewith and positioned adjacent to the computer mouse for use thereof by a user in an ergonomically correct position;

means for adjusting the position of the computer mouse relative to the ergonomic extension for enabling use of the computer mouse and ergonomic extension by users having different size hands;

guide means on the computer mouse and the ergonomic extension for facilitating guided movement of the computer mouse relative to the ergonomic extension; and said means for adjusting the position of the computer mouse relative to said ergonomic extension comprises a plurality of teeth on the computer mouse that engage with a plurality of teeth on the ergonomic extension for releasably locking said ergonomic extension in any of a plurality of positions with respect to said computer mouse, said computer mouse further comprising an extension lever, said plurality of teeth on the computer mouse being positioned on the extension lever, wherein said guide means comprises a first guide slot on said ergonomic extension and a protuberance on said extension lever, said first guide slot engaging with and guiding said protuberance, wherein the ergonomic extension comprises a bottom cover, and the first guide slot and plurality of teeth on the ergonomic extension are positioned on the bottom cover.

* * * * *